United States Patent Office 3,321,481
Patented May 23, 1967

3,321,481
HETEROCYCLIC N-OXIDE-TRI-PHENYLCHLORO-TIN SALTS
Ludwig Schröder, Klaus Thomas, and Dietrich Jerchel, Biberach an der Riss, Germany, assignors to C. H. Boehringer Sohn, Ingelheim am Rhine, Germany, a limited partnership of Germany
No Drawing. Filed Mar. 24, 1964, Ser. No. 354,454
Claims priority, application Germany, Mar. 25, 1963, B 71,288
9 Claims. (Cl. 260—270)

This invention relates to novel complex salts of tin as well as to pharmacodynamic compositions comprising such complex salts as active ingredients and to a method of combatting bacteria and fungi.

More particularly, the present invention relates to novel complex salts of tin of the formula

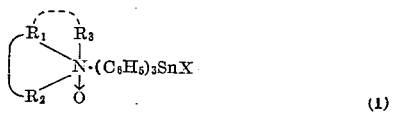

(I)

wherein
$R_1$ and $R_2$ represent the members of a bivalent acyclic atom grouping which, together with the adjacent nitrogen atom, complete an unsaturated heterocyclic ring which may optionally be substituted at one or more of its ring atoms,
$R_3$ is lower alkyl or a bivalent acyclic atom grouping which, together with the adjacent nitrogen atom and $R_1$ and $R_2$, completes an unsaturated heterocyclic ring which may optionally be substituted at one or more of its ring carbon atoms, and
X is a halogen, especially chlorine.

Examples of unsaturated heterocyclic ring systems which $R_1$ and $R_2$ or $R_1$, $R_2$ and $R_3$ may form with the nitrogen atom are pyridine, quinoline, pyrimidine, imidazole, pyrazole or thiazole rings or their partially hydrogenated analogs.

Examples of substituents which may be attached to the ring atoms of these heterocyclic rings are halogen, nitro, lower alkyl and lower alkoxy.

The novel complex tin salts according to the present invention may be prepared by reacting a heterocyclic N-oxide of the formula

(II)

wherein $R_1$, $R_2$ and $R_3$ have the same meanings as in Formula I above, with a triphenyl-tin halide of the formula $$(C_6H_5)_3SnX$$ (III)

wherein X has the same meanings as in Formula I. The reaction is advantageously performed at room temperature in an inert organic solvent, such as methanol, ethanol, acetone, methylene chloride, chloroform or the like, using equimolar amounts of the starting compounds II and III. After evaporating the inert solvent the novel reaction product crystallizes and may be purified by recrystallization from a suitable solvent, such as a mixture of methylene chloride and ether.

The preparation of N-oxides of the Formula II above is described in Houben-Weyl, "Methoden der Organischen Chemie," vol 11/2, 4th Edition, pages 120, et seq. (1958), and the preparation of triphenyl-tin halides of the Formula III is described by Kozeschkow et al., Chemische Berichte, 67, page 1348 (1934).

The following examples further illustrate the present invention and will enable others skilled in the art to understand it more completely. It should be understood, however, that the invention is not limited to the particular examples given below.

EXAMPLE 1
*Preparation of pyridine-N-oxide-triphenylchloro-tin*

Equimolar amounts of triphenyl tin chloride and pyridine-N-oxide were separately dissolved in methanol, the solutions were combined, and the resulting solution was evaporated on a water bath. Upon cooling, a crystalline substance separated out, which was recrystallized from a mixture of methylene chloride and ether. The purified product was identified to be the complex tin salt of the formula

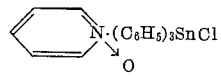

having a melting point of 131–133° C. The yield was 84% of theory.

EXAMPLE 2
*Preparation of 2-methylpyridine-N-oxide-triphenylchloro-tin*

Using a procedure analogous to that described in Example 1, the complex tin salt of the formula

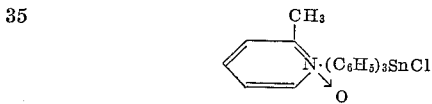

having a melting point of 136–138° C. was prepared from 2-methylpyridine - N - oxide and triphenyl tin chloride. The yield was 98.8% of theory.

EXAMPLE 3
*Preparation of 4-nitropyridine-N-oxide-triphenylchloro-tin*

Using a procedure analogous to that described in Example 1, the complex tin salt of the formula

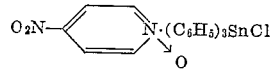

having a melting point of 118–120° C. was prepared from 4-nitro-pyridine-N-oxide and triphenyl tin chloride. The yield was 89% of theory.

EXAMPLE 4
*Preparation of 2-methyl-4-nitropyridine-N-oxide-triphenylchloro-tin*

Using a procedure analogous to that described in Example 1, the complex tin salt of the formula

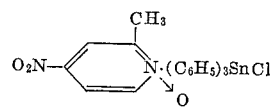

having a melting point of 97–99° C. was prepared from 2-methyl-4-nitropyridine-N-oxide and triphenyl tin chloride. The yield was 94% of theory.

EXAMPLE 5

*Preparation of 2-(di-n-butyl-methyl)-pyridine-N-oxide-triphenylchloro-tin*

Using a procedure analogous to that described in Example 1, the complex tin salt of the formula

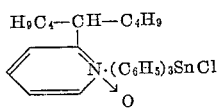

having a melting point of 115–117° C. was prepared from 2-(di-n-butyl-methyl)-pyridine-N-oxide and triphenyl tin chloride. The yield was 56% of theory.

EXAMPLE 6

*Preparation of quinoline-N-oxide-triphenylchloro-tin*

Using a procedure analogous to that described in Example 1, the complex tin salt of the formula

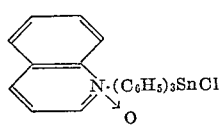

having a melting point of 165–167° C. was prepared from quinoline-N-oxide and triphenyl tin chloride. The yield was 88.5% of theory.

EXAMPLE 7

*Preparation of quinaldine-N-oxide-triphenylchloro-tin*

Using a procedure analogous to that described in Example 1, the complex tin salt of the formula

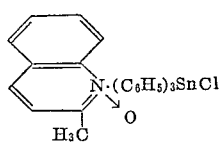

having a melting point of 96–98° C. was prepared from quinaldine-N-oxide and triphenyl tin chloride. The yield was 93% of theory.

The novel complex tin salts obtained in accordance with the present invention are derivatives of pentacoordinated tin, as evidenced by their physical properties. They have useful pharmacodynamic properties. More particularly, they exhibit antimicrobial activities, especially bactericidal and fungicidal activities coupled with low phytotoxicity. In addition, they have molluscacidal properties.

The complex tin salts according to the present invention are particularly effective as bactericides against *Staphylococcus aureus* SC 511 and *Streptococcus aronson* at dilutions up to 1:10⁵. As fungicides, they are especially effective against Epidermophyton K.W. and *Aspergillus niger* at concentrations up to 1:10⁶. As molluscacides, they have been found to be effective against *Australorbis glabratus* molluscs at dilutions up to 1:10⁶.

By virtue of these pharmacodynamic properties the tin salts of the present invention are useful as active ingredients in disinfectant, fungicidal and molluscacidal compositions. Such compositions consist essentially of a customary inert carrier, either liquid or solid, and the active ingredient uniformly distributed therethrough. The compositions may also comprise other active bactericidal, fungicidal or molluscacidal ingredients as well as customary assistants, such as stabilizers, wetting agents and additives which enhance the adhering properties of the compositions to the surface to which they are applied.

For instance, an effective liquid disinfectant composition is obtained when one of the complex tin salts according to the present invention is dissolved in a suitable solvent at a concentration of 1:5,000 to 1:10,000.

Similarly, an effective solid fungicidal composition adapted for application to leaf plants as a dusting powder is obtained when a homogenous powdered mixture is formed which comprises 20–80% by weight, preferably 50% by weight, of one of the complex tin salts embraced by Formula I above; 10% by weight of a stabilizer, such as the calcium salt of lignin-sulfonic acid; 1–5% by weight of an adherent, such as methylcellulose; 1–5% by weight of a wetting agent, such as tetrapropylenebenzosulfonate; and 10–73% by weight of a carrier, such as kaolin, bentonite, kieselguhr or siliceous chalk.

While the present invention has been illustrated with the aid of certain specific embodiments, it will be apparent to others skilled in the art that the invention is not limited to those particular embodiments, and that various changes and modifications may be made without departing from the spirit of the invention or the scope of the appended claims.

We claim:
1. A compound of the formula

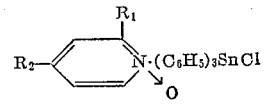

or

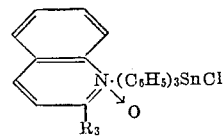

wherein
$R_1$ is alkyl of 1 to 9 carbon atoms,
$R_2$ is hydrogen or nitro, and
$R_3$ is hydrogen or methyl.

2. The process of preparing a compound of the formula

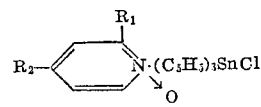

or

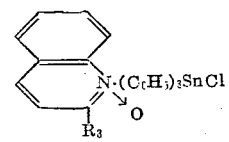

wherein
$R_1$ is alkyl of 1 to 9 carbon atoms,
$R_2$ is hydrogen or nitro, and
$R_3$ is hydrogen or methyl,
which comprises reacting a heterocyclic N-oxide of the formula

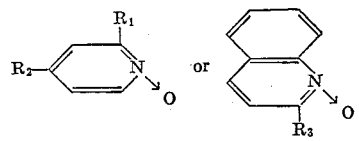

wherein $R_1$, $R_2$ and $R_3$ have the above-indicated meanings, with an equimolar amount of triphenyltin chloride at substantially room temperature in the presence of an inert organic solvent, and recovering the reaction product.

3. Pyridine-N-oxide-triphenylchloro-tin.
4. 2-Methylpyridine-N-oxide-triphenylchloro-tin.
5. 4-Nitropyridine-N-oxide-triphenylchloro-tin.
6. 2-Methyl - 4 - nitropyridine - N - oxide - triphenylchloro-tin.

7. 2-(Di-n-butyl-methyl) - pyridine-N-oxidetriphenyl-chloro-tin.
8. Quinoline-N-oxide-triphenylchloro-tin.
9. Quinaldine-N-oxide-triphenylchloro-tin.

References Cited by the Examiner

UNITED STATES PATENTS

| | | | |
|---|---|---|---|
| 2,429,096 | 10/1947 | Ladd | 167—33 |
| 2,767,187 | 10/1956 | Shrader | 260—270 |
| 2,809,146 | 10/1957 | Osborn | 167—33 |
| 2,809,971 | 10/1957 | Bernstein et al. | 260—270 |
| 2,827,462 | 3/1958 | Dorsey | 260—270 |
| 2,867,566 | 1/1959 | Weinburg | 260—270 X |
| 3,027,372 | 3/1962 | Starrs | 260—270 |
| 3,047,579 | 7/1962 | Witman | 260—289 |

ALEX MAZEL, *Primary Examiner.*

FRANK CACCIAPAGLIA, Jr., *Examiner.*

J. D. GOLDBERG, D. G. DAUS, *Assistant Examiners.*